United States Patent

[11] 3,594,578

[72] Inventor Claes Thomas Ohman
 Lidingo, Sweden
[21] Appl. No. 878,069
[22] Filed Nov. 19, 1969
[45] Patented July 20, 1971
[73] Assignee AGA Aktiebolog
 Lidingo, Sweden
[32] Priority Nov. 29, 1968
[33] Sweden
[31] 16280/69

[54] LINE SCANNER FOR INFRARED RADIATION
 13 Claims, 3 Drawing Figs.
[52] U.S. Cl. .................................................. 250/83.3,
 250/234, 250/236
[51] Int. Cl. .................................................. H01j 3/14
[50] Field of Search ........................................ 250/83.3 H,
 83.3 HP, 234, 236

[56] References Cited
UNITED STATES PATENTS

| | | | |
|---|---|---|---|
| 2,968,735 | 1/1961 | Kaufold et al. | 250/236 X |
| 3,200,010 | 11/1965 | Hand, Jr. | 250/83.3 H |
| 3,237,010 | 2/1966 | Elliott et al. | 250/83.3 H |

*Primary Examiner*—Archie R. Borchelt
*Attorney*—Larson and Taylor

ABSTRACT: A line scanner for infrared radiation includes a rotatable unit which houses two optical systems, each responsive to different ranges of wavelength. A deflector arrangement deflects the optical axes of these systems in two directions along the axis of rotation of the unit. The first optical system is connected to an infrared detector whereas the second system is used for orientation purposes either by (1) forming a visible image of the field to be scanned or (2) emitting light pulses in a predetermined direction for reference.

INVENTOR
CLAES THOMAS ÖHMAN
BY *Larson and Taylor*
ATTORNEYS

LINE SCANNER FOR INFRARED RADIATION

FIELD OF THE INVENTION

The present invention relates to line scanners for infrared radiation.

BACKGROUND OF THE INVENTION

Line scanners generally include an oscillating or rotating element which is used for producing the requisite scanning movement and for causing a right-angle deflection of the optical axis of the scanner whereby infrared light received by the scanner is directed toward an infrared detector. It is, of course, very important that the field of scan be referenced so that the detected signal can be correlated with the scanning movement.

SUMMARY OF THE INVENTION

It will be appreciated from the discussion hereinabove that in many instances it will be of advantage to provide a second optical system, which may be responsive to visible light or to another range of infrared wavelengths, for purposes of orientation. Where the second optical system is responsive to visible light, the system may form an image of the scanning field for orientation. It is noted that an infrared-responsive optical system is generally not suitable for forming an image of the scanning field in that the response of such a system to visible light will tend to be too low. In another approach, the second optical system may be used for transmitting a light pulse used in orientation.

In accordance with a presently preferred embodiment of the invention a line scanner is provided which includes a rotatable unit including first and second optical systems. A deflecting arrangement is provided for deflecting the optical axes of the two systems in opposite directions along the axis of rotation of the unit. An infrared radiation detector is provided which responds to radiation from the first optical system whereas "optical reference means" are optically connected to the second optical system.

These optical reference means may comprise an image-viewing system for forming an image of the scanned field so that controlled rotation of the unit through a predetermined angle will cause positioning of the infrared detector such that the response of the detector to a particular selected area of the scanned field can be determined. For example, where the axes of the two optical systems are spaced-apart by 180°, the unit can be turned manually until the desired point appears in the image field. Then by rotating the unit through an angle of 180° the detector will provide an indication of the infrared response in the selected direction.

In a second embodiment the optical reference means may comprise a light pulse generator for producing synchronous light flashes to provide orientation of the detected infrared radiation relative to the scanned field.

Other features and advantages of the present invention will be set forth in or apparent from the detailed description of preferred embodiments thereof found hereinbelow.

DESCRIPTION OF THE PREFERRED EMBODIMENTS

Figure 1:
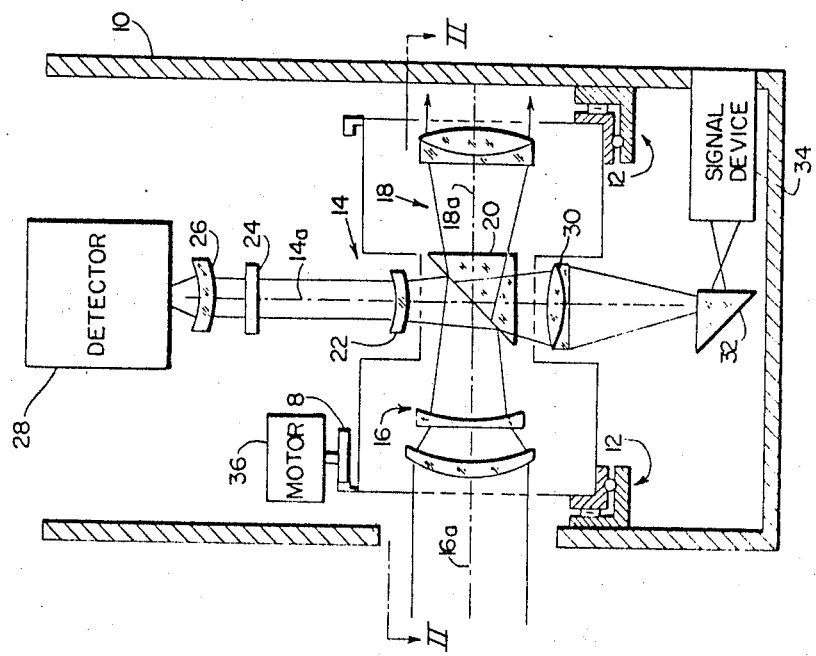
FIG. 1 is a schematic sectional view of a scanning unit in accordance with one embodiment of the present invention.

Referring to FIG. 1, a schematic representation of a line scanner in accordance with the present invention is shown. The scanner includes a housing 10 including internal bearings 12 for rotatably mounting a scanning unit 14. Rotatable unit 14 includes first and second optical systems 16 and 18. Optical system 16 responds to infrared light and collects or receives radiation directed along the optical axis thereof, this axis being denoted 16a. Infrared light received by optical system 16 is reflected from a mirror surface provided on a deflector device 20 in the form of a prism. The infrared light is deflected from prism 20 along the axis of rotation 14a of unit 14 and is passed through a collimating lens 22 and a filter 24 to a positive lens 26 which focuses the light onto a detector 28. Filter 24 and detector 28 together determine the range of infrared wavelengths to which the instrument responds.

The optical axis 18a of the second optical system 18 is colinear with optical axis 16a of the first optical system 16. The second optical system 18 may respond to a different range of infrared wavelengths than optical system 16 but in the embodiment under consideration, optical system 18 responds to visible light. Optical system 18 directs received light toward the undersurface of the mirror surface of prism 20, the light then being reflected along the axis of rotation 14a of unit 14 as above. The light reflected from prism 20 passes through a lens 30 and a deflecting prism 32 to a signal device 34. Signal device 34 is used in providing orientation of the infrared light received by detector 28 and, as discussed hereinabove, may take either of two general forms. In one embodiment of the invention, signal device 34 may comprise an image-viewing system such as an eyepiece. In a second embodiment, the signal device 34 may take the form of a light pulse generator for emitting a flash of light used to indicate a selected reference direction within the scanning field. In both embodiments a motor 36 may be utilized to provide rotation of unit 14, motor 36 being coupled to unit 14 through a gearing arrangement denoted 38.

Considering the embodiment of the invention wherein signal device 34 comprises an image-viewing system such as a lens, the radiation from a particular direction can be found by disconnecting motor 26 and turning the rotary unit 14 manually until the desired point or area of interest appears in the image field of the viewing system. As can be best seen in FIG. 2, axes 16a and 18a are spaced-apart angularly by 180° and thus when unit 14 is rotated through 180° detector 28 will be responding to infrared radiation from the particular point or area in question in the scanning field. The motor 36 can be utilized to provide precise rotation of unit 14 through the desired angle although this operation can also be performed manually.

As discussed hereinabove, signal device 34 may also be used to produce synchronous light flashes to indicate a predetermined reference direction within the scanning field. For such an embodiment, motor 36 is utilized to rotate unit 14 at a constant speed such as, for example, 100 r.p.m.

Figure 2:
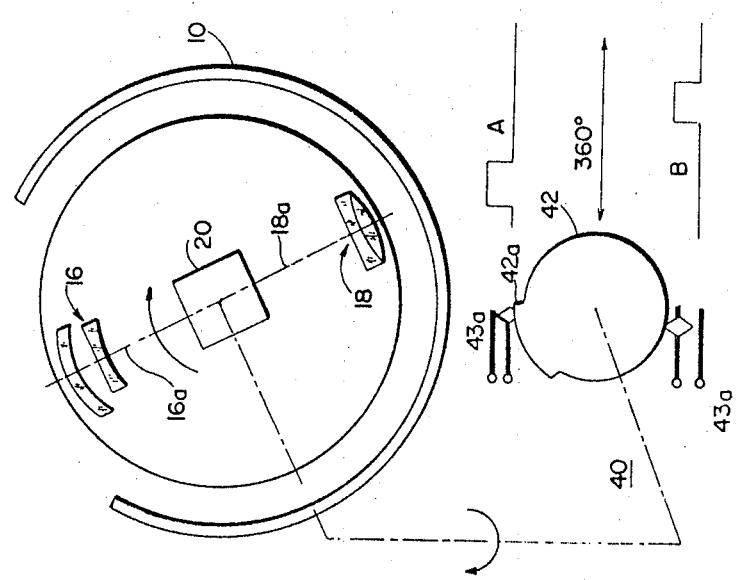
FIG. 2 is a sectional view taken generally along the line II-II in FIG. 1 and further illustrates a device for producing control pulses.

Referring to FIG. 2, an arrangement including a contact control cam 40 is utilized to create synchronous control pulses. These pulses may be used in directly producing the synchronous light flashes referred to hereinabove although, in the embodiment under consideration, the arrangement shown in FIG. 2 is used in providing control pulses denoted A and B for the electrical circuit shown in FIG. 3. For this embodiment the unit 14 is driven at a constant speed by motor 36 and signal device 34 comprises a light-pulse generator for transmitting synchronous flashes of light through the second optical system 18. Referring to FIG. 2 again, the pulse A is of a duration corresponding to the duration of the infrared scan. Pulses A and B are 180° out of phase and thus if light pulses are transmitted responsive to pulse B when the second optical system is oriented in a predetermined direction relative to the scanning field, then the first optical system 16 will be oriented in the same direction during the rotation of unit 14 at a time bearing the corresponding relationship to pulse A.

Pulses A and B may be generated in any known manner and in FIG. 2 a rotating cam disc 42 is utilized to provide selective opening and closing of first and second switch contacts 43a and 43b. Cam disc 42 is driven in synchronism with rotatable unit 14 and includes an outward extending cam portion 42a of an angular extent corresponding to the angular extent of the scanning field. For example, where scanning is provided during one-fourth of the period of rotation of unit 14, the beginning and end of the cam portion 42a of cam disc 42 will be separated by 90°. As stated, the cam portion 42a of cam 42 controls actuation of contacts 43a and 43b which are disposed in diametrical opposition to one another about the periphery of cam disc 42 so as to create pulses A and B discussed hereinabove.

Figure 3:
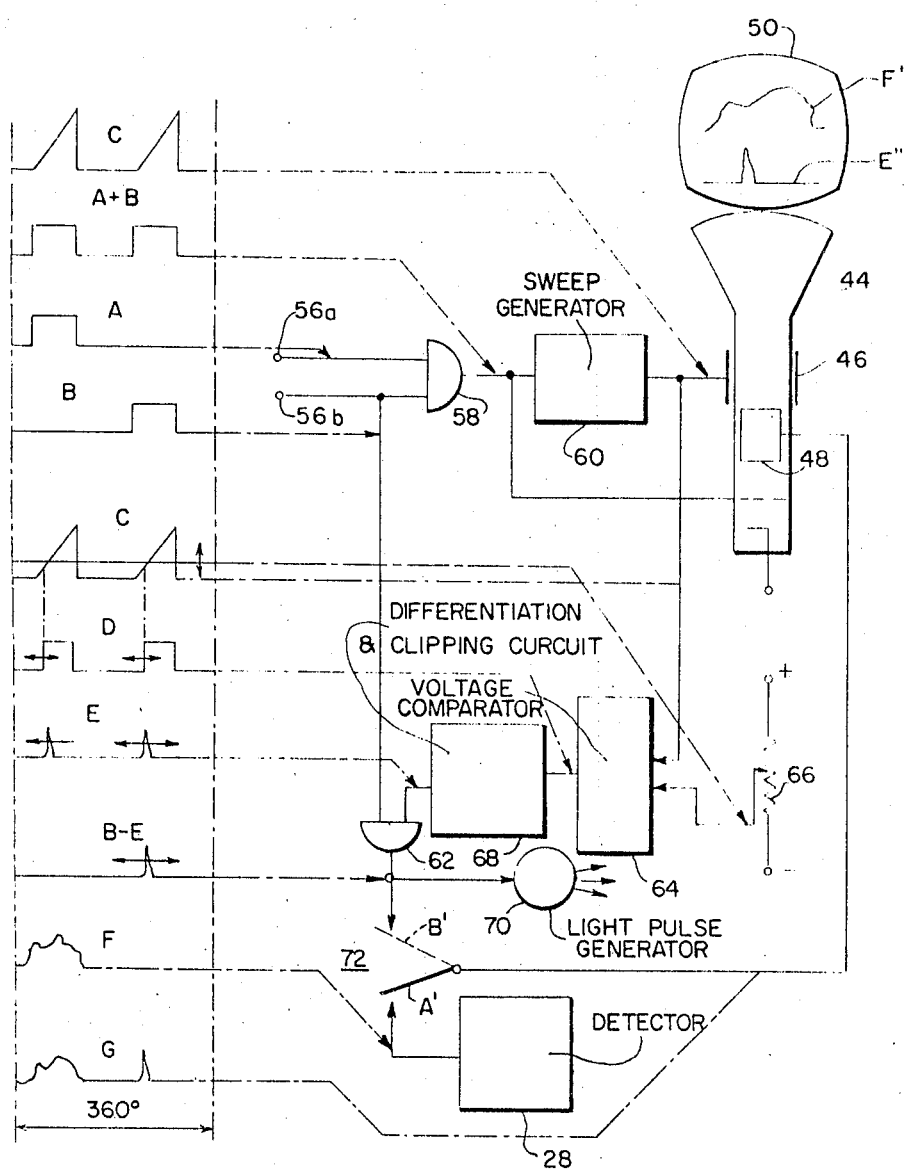
FIG. 3 is a schematic circuit diagram of the electrical circuitry utilized in accordance with one embodiment of the invention.

Referring to FIG. 3, the electrical circuit diagram for the system referred to hereinabove is shown. An image display tube 44 includes horizontal and vertical deflection systems 46 and 48 and an image screen 50 used in displaying the variation intensity of infrared radiation along the line of scan. A plot of the infrared radiation intensity as a function of the scanning position is indicated as graph F'. The image screen 50 is also used to display a marking pulse E'' used in indicating the position of the light pulses produced by signal device 34 relative to the scan field.

The control circuit of FIG. 3 includes first and second input terminals 56a and 56b which are connected to receive pulses A and B, respectively. Terminals 56a and 56b are connected to the inputs of an OR-circuit 58, the output of OR-circuit 58 being utilized to control a sweep generator 60. Thus sweep generator 60 generates a pair of sawtooth pulses C corresponding to, and in coincidence with, pulses A and B during each rotation of unit 14.

Terminal 56b is also connected to a first input of an AND-circuit 62. The output from sweep generator 60 is also applied to one input of a voltage comparator 64 which is connected through a differentiating and clipping circuit 68 to the second input of AND-circuit 62. The second input to voltage comparator 64 is connected to the sliding contact of a potentiometer 66. Voltage comparator 64 compares the amplitude of the sweep voltage produced by sweep generator 60 with the reference voltage provided by potentiometer 66 and produces an output D in the form of pulses of variable duration, as indicated. The differentiating and clipping circuit 68 differentiates the output D from voltage comparator 64 and suppresses the negative spikes created from the rear flanks of the pulses to thus produce a marking pulse E. The position of the marking pulse E along the line of scan corresponds to the time at which a sawtooth pulse produced by sweep generator 60 reaches the reference voltage level provided by potentiometer 66. With a reference pulse B applied to one input thereof and marking pulse E applied to the other input thereof, AND-circuit 62 will produce an output for every second marking pulse as indicated. This output is utilized to energize a light pulse generator 70 and is also connected to a first input terminal of a two-position switch 72. Switch 72 is synchronously operated such that the switch contact will be in the upper position denoted B' during the time corresponding to pulse B and in the lower position denoted A' during the time corresponding to the duration of pulse A. During the time corresponding to the duration of pulse B the marking pulse E is applied to display tube 44 and the graphical representation thereof, denoted E'' and referred to hereinabove, appears on screen 50. Marking pulse E thus indicates the time during the scan at which the light pulse generator 70 is actuated.

Considering the operation of the embodiment just discussed, two sweep pulses C are produced during each complete revolution or rotation of unit 14, the first of these pulses corresponding to the duration of the infrared scan and the second to the duration of the "visible" scan. Switch 72 is correspondingly actuated to alternately connect the signal F produced by detector 28 and the output of AND-circuit 62, that is, every second marking pulse E, to display tube 44 so that graphical representations F' and E'' of these outputs appear on screen 50. The pulses A and B are also applied to a control grid of display tube 44 to cause suppression of the electron beam between scans.

It will be appreciated from the foregoing that by varying the setting of potentiometer 66 the time at which an output is produced by voltage comparator is correspondingly varied and hence the time at which marking pulse E causes actuation of pulse generator 70 during the duration of pulse D. Thus if signal means 34 or, correspondingly, light pulse generator 70 emits light pulses for a predetermined orientation of unit 14 the result is equivalent to directing a continuous beam of light toward a point in the scanning field as long as the constant angular velocity of unit 14 exceeds a particular value.

Although the present invention has been described with reference to particular exemplary embodiments thereof, it will be understood by those skilled in the art that variations and modifications may be effected in the exemplary embodiments without departing from the scope and spirit of the invention.

I claim:

1. A line scanner for infrared radiation comprising, a rotatable optical unit including a first optical system having the optical axis thereof perpendicular to the axis of rotation of said unit, a second optical system having the optical axis thereof perpendicular to said axis of rotation, deflecting means for deflecting the optical axis of said first optical system and the optical axis of said second optical system into coincidence with said axis of rotation, an infrared radiation detector responsive to radiation received by said first optical system and optical reference means optically connected to said second optical system.

2. A line scanner as claimed in claim 1 wherein said optical axes of said first and second optical systems are parallel.

3. A line scanner as claimed in claim 2 wherein said optical axes of said first and second optical systems are colinear.

4. A line scanner as claimed in claim 1 wherein said second optical system is responsive to a range of infrared radiation different from that to which said first optical system is responsive.

5. A line scanner as claimed in claim 1 wherein said second optical system is responsive to visible light.

6. A line scanner as claimed in claim 5 wherein said optical reference means comprises an image-viewing system.

7. A line scanner as claimed in claim 5 wherein said optical reference means comprises a light pulse generator.

8. A line scanner as claimed in claim 1 further comprising a motor coupled to said rotatable unit for driving said rotatable unit.

9. A line scanner according to claim 7 further comprising a motor coupled to said rotatable unit for driving said rotatable unit and synchronous control means for generating a first control pulse at a predetermined angular position of said first optical system and for generating a second control pulse at a predetermined angular position of said second optical system.

10. A line scanner as claimed in claim 9 wherein said pulse generator is responsive to said second control pulse.

11. A line scanner as claimed in claim 10 further comprising means for deriving marking pulses of adjustable delay.

12. A line scanner as claimed in claim 11 further comprising an image display tube including horizontal and vertical deflection systems and a horizontal-sweep generator responsive to said first and second control pulses.

13. A line scanner as claimed in claim 12 further comprising switching means for applying the output of said detector to said tube during alternate horizontal sweeps and for applying marking pulses to said tube during the remaining alternate sweeps.